United States Patent
Miyamoto

(10) Patent No.: US 8,843,654 B2
(45) Date of Patent: Sep. 23, 2014

(54) DATA PACKET TRANSFER OVER WIDE AREA NETWORK IN FAST AND RELIABLE MANNER

(75) Inventor: Takahiro Miyamoto, Saitama (JP)

(73) Assignee: KDDI Corporation, Tokyo (JP)

( * ) Notice: Subject to any disclaimer, the term of this patent is extended or adjusted under 35 U.S.C. 154(b) by 447 days.

(21) Appl. No.: 13/233,658

(22) Filed: Sep. 15, 2011

(65) Prior Publication Data

US 2012/0079065 A1 Mar. 29, 2012

(30) Foreign Application Priority Data

Sep. 29, 2010 (JP) ................................ 2010-218154

(51) Int. Cl.
- *G06F 15/16* (2006.01)
- *H04L 12/28* (2006.01)
- *H04L 12/835* (2013.01)
- *H04L 12/825* (2013.01)

(52) U.S. Cl.
CPC .............. *H04L 47/30* (2013.01); *H04L 12/287* (2013.01); *H04L 47/263* (2013.01); *Y02B 60/31* (2013.01)
USPC ............ 709/232; 709/233; 709/235; 709/236

(58) Field of Classification Search
USPC ................................................. 709/227–229
See application file for complete search history.

(56) References Cited

U.S. PATENT DOCUMENTS

| | | | |
|---|---|---|---|
| 2008/0253398 A1* | 10/2008 | Calvignac et al. ............ | 370/474 |
| 2009/0213850 A1* | 8/2009 | Viger et al. .................... | 370/389 |
| 2010/0232294 A1 | 9/2010 | Samuels et al. | |

FOREIGN PATENT DOCUMENTS

| | | |
|---|---|---|
| JP | A-2004-159203 | 6/2004 |
| JP | A-2005-136684 | 5/2005 |
| JP | A-2007-295217 | 11/2007 |
| JP | A-2008-526132 | 7/2008 |
| JP | A-2010-504047 | 2/2010 |
| WO | WO 2006/071866 A2 | 7/2006 |
| WO | WO 2008/005629 A2 | 1/2008 |
| WO | WO 2008/034000 A1 | 3/2008 |
| WO | WO 2009/032259 A1 | 3/2009 |

OTHER PUBLICATIONS

"Pre-Congestion Notification (PCN) Architecture;" *Network Working Group*; Request for Comments No. 5559; Jun. 2009; pp. 1-55; searched Sep. 18, 2010; <http://tools.ietf.org/html/rfc5559>.

(Continued)

*Primary Examiner* — Shirley Zhang
(74) *Attorney, Agent, or Firm* — Oliff PLC

(57) ABSTRACT

A method of operating a data transfer device is disclosed. The data transfer device is connected to a partner data transfer device via a wide area network, to relay data packets between first and second communication devices. The method further includes: receiving first-protocol-based data packets from the first communication device via a first-protocol-based connection within a first access network; in response to reception of the first-protocol-based data packets, sending back acknowledgement to the first communication device via the first-protocol-based connection, on behalf of the second communication device; encapsulating first-protocol-based data packets received from the first communication device, to convert the first-protocol-based data packets to a plurality of second-protocol-based data packets; and transferring the second-protocol-based data packets to partner data transfer device via a second-protocol-based connection within the wide area network. The first protocol is a sliding window protocol, and the second protocol is a protocol without using a sliding window.

14 Claims, 8 Drawing Sheets

(56) References Cited

OTHER PUBLICATIONS

"Trend of Standardization of IEEE-802.1/802.3: Newest Trend in DCB (Data Center Bridging on which Standardization is in Progress by Working Group in IEEE802.1;" Mar. 24, 2009; pp. 1-7; searched Sep. 18, 2010; <http://wbb.forum.impressrd.jp/report/20090513/725>.

Apr. 17, 2014 Office Action issued in Japanese Patent Application No. 2010-218154 (with English translation).

* cited by examiner

DATA PACKET TRANSFER OVER WIDE AREA NETWORK IN FAST AND RELIABLE MANNER

CROSS-REFERENCE TO RELATED APPLICATIONS

This application claims the priority benefit of Japanese Patent Application No. 2010-218154, filed Sep. 29, 2010, the content of which is incorporated herein by reference in its entirety.

BACKGROUND OF THE INVENTION

1. Field of the Invention

The invention relates to techniques of transferring data packets over a wide area network in a fast and reliable manner.

2. Description of the Related Art

As is well known, the Internet is a network which is configured by interconnecting various kinds of networks managed by different telecommunication carriers, using communication protocols which cannot always maintain a desired communication bandwidth or a desired quality of service.

In contrast, owing to the recent development of cloud computing services and wide area network Ethernet (registered trademark) services, it has been more popular that communication devices (e.g., data terminal equipment DTE or terminals, such as PCs, cell phones or smart phones, or servers, etc.) communicate with each other via a wide area network. In general, a desired communication bandwidth and a desired quality of service are guaranteed in a wide area network which is operated by a particular carrier, on a per-contracted-bandwidth basis.

In this regard, the "wide area network" refers to, not limiting, for example, a wide area Ethernet network, which is a mesh network employing closed networking technologies and VLAN (Virtual LAN (Local Area Network)) technologies, to provide high security enough to be comparable to that of dedicated or licensed lines.

In such a wide area network, a service level agreement is made between a customer and a service provider, with respect to delay, availability (including, for example, access line multiplexing), time to recovery or the like.

Consequently, such a highly secured network is featured in that a highly reliable protocol such as a TCP (Transmission Control Protocol) is not required to play an important role, and that, because such a network can make a multipoint connection, high flexibility is provided in altering the configuration of an intra network.

In the Internet, a TCP can be used which represents all of possible data transfer protocols for IP (Internet Protocol) packets. The TCP provides highly reliable data transmission, by allowing a receiver, if it has correctly received a data packet from a sender, to send back an acknowledgement to the sender, and allowing the sender, if it does not receive an acknowledgement before it timeouts, to re-transmit the same data packet to the receiver until the sender receives an acknowledgement, to thereby assure arrival of every and each data packet even if packet loss occurs.

A technique is known of operating sender-side and receiver-side data transfer devices for use in relaying data packets between them, such that the sender-side data transfer device, if the receiver has correctly received a pre-selected total number of data packets from the sender, to send an acknowledgement to the sender, to thereby improve the throughput of data packets transmitted from the sender (see, for example, Patent Document No. 1 below).

This technique allows the receiver-side data transfer device to notify the sender-side data transfer device of how many data packets the receiver-side data transfer device can receive or buffer (which relates to the degree of congestion), to thereby allow the sender-side data transfer device to control the time at which the next acknowledgement will be sent back to the sender.

Another technique is also known of dynamically controlling a transmission rate of data packets in a data transfer device, based on an RTT (Round Trip Time) and the degree of congestion in an intervening network (see, for example, Patent Document No. 2). This technique allows calculation of a target rate for balancing a particular traffic flow with other traffic flows (e.g., a TCP traffic flow) in determining a transmission rate.

Still another technique is also known of dynamically allocating transmission rates to traffic flows separately, when a data transfer device attempts to transfer a plurality of traffic flows which are combined into a single network path (see, for example, Patent Document No. 3).

An additional technique is also known of operating sender-side and receiver-side data transfer devices for use in relaying data packets between a sender and a receiver, such that the sender-side data transfer device, upon reception of a pause frame from the receiver-side data transfer device, lowers a transmission rate (see, for example, Patent Document No. 4).

A still additional technique is also known of operating a communicating device to determine the length of a data transfer time for each of a plurality of other communication devices, so as to depend on the data transfer rate (see, for example, Patent Document No. 5).

It is noted that another technique is also known in which the number of flows active in a network is controlled so that they can be within a designated bandwidth (by deciding whether to admit a new flow or terminate some of the existing flows) (see, for example, Non-Patent Document No. 1), and that still another technique is also known in which, if a bridge or switch detects traffic congestion, then a traffic flow that has caused the congestion is identified, and the bridge sends a congestion notification to a sender (i.e., an end station) that initiated the identified traffic flow, whereby the sender reduces a transmission rate to relieve congestion (see, for example, Non-Patent Document No. 2). The latter technique is advantageous, because, when a plurality of traffic flows have something to do with the traffic congestion, a transmission rate is lowered for every traffic flow, to thereby create an unused portion within a bandwidth.

LIST OF PATENT DOCUMENTS

1. WO 2008/005629,
2. JP2008-526132,
3. WO 2009/032259,
4. JP2004-159203, and
5. JP2007-295217.

LIST OF NON-PATENT DOCUMENTS

1. "Pre-Congestion Notification (PCN) Architecture," Network Working Group, Request for Comments No. 5559, June 2009, <URL:http://tools.ietf.org/html/rfc5559>, visited online on Sep. 18, 2010, and
2. "Trend of Standardization of IEEE802.1/802.3: Newest Trend in DCB (Data Center Bridging) on which standardization is in progress by Working Group in IEEE802.1, <URL:http://web.forum.impressrd.jp/report/20090513/725>, visited online on Sep. 18, 2010.

BRIEF SUMMARY OF THE INVENTION

When communication devices are connected to each other via a transmission path in the form of a bandwidth-guaranteed wide area network, with each communication device connected to a TCP access network to make a TCP connection, the TCP connection constitutes a considerable bottleneck link that limits the throughput of packets transmitted between the communication devices.

More specifically, when the TCP connection is used, a sender, after sending a data packet to a receiver, waits for an acknowledgement to come from the receiver. Due to this, there is transmission delay between the sender and the receiver, and therefore, even if a contracted bandwidth of the intervening wide area network is expanded, that is, even if packet transmission through the wide area network is made faster, the transmission throughput between the sender and the receiver cannot increase to the maximum throughput that is equal to that of the contracted bandwidth.

If a wide area network is configured to accept TCP data packets without modification, data transmission with high reliability is provided owing to acknowledgement back, sliding window size (i.e., the maximum amount of data that can be sent without having to wait for an acknowledge), and re-transmission mechanisms according to the TCP.

In this case, a TCP sender which is connected to the wide area network via an access network, starts sending data packets within the smallest size of a sliding or variable sized window and, if a receiver, then, determines that its receive capacity or buffer is not full, the receiver sends back to the sender an acknowledgement indicating an increased size of a window. As the transmission and reception is repeated, the window size is increasingly adjusted or optimized.

However, in this case, the longer the distance of transmission over the wide area network, the more the transmission is delayed, and, until the window size reaches an optimal value, the delay makes less use of the maximum possible throughput of transmission over the wide area network.

More specifically, one of the reasons why the TCP cannot increase a transmission throughput to an adequate extent in a long-distance communication is that a certain amount of time is required for adjustment of the window size (i.e., how many data packets can be sent in succession between consecutive acknowledgements), as a result of repeated transmission/reception between communication devices.

In contrast, a UDP (User Datagram Protocol) is faster, but less reliable in data transmission than the TCP, because the UDP does not use acknowledgements.

It is noted that, for any conventional technique employed for a data flow from a sender to a receiver through an intervening connection between a sender-side data transfer device and a receiver-side data transfer device over a wide area network, unique transmission control is performed for the intervening connection, and does not reflect the nature of protocols used for the sender and the receiver.

In view of the foregoing, it would be desirable to transfer data packets over a wide area network in a fast and reliable manner.

According to a first aspect of the invention, a data transfer device is provided which comprises:

an access-network interface that allows the data transfer device to be connected to at least one first communication device via a first access network; and a wide-area-network interface that allows the data transfer device to be connected to a wide area network having a contracted bandwidth managed by a telecommunication carrier, wherein the data transfer device is connected to a partner data transfer device via the wide area network, the partner data transfer device is configured to be substantially common in function to the data transfer device, the partner data transfer device is connected to at least one second communication device, whereby the data transfer device and the partner data transfer cooperate to relay data packets between the at least one first and at least one second communication devices via the wide area network, the data transfer device further comprising:

a connection establishment section configured to establish a connection using a second data-transfer-protocol between the data transfer device and the partner data transfer device via the wide-area-network interface;

a connection recognition section configured to recognize establishment of a connection using a first data-transfer-protocol between the first and second communication devices via the access-network interface and the wide-area-network interface;

a plurality of first buffers for temporary storage of data packets using the first data-transfer-protocol received via the access-network interface, with the first buffers associated with respective contracted bandwidths;

a bandwidth controller configured to control output of the data packets from the first buffers, on a per-buffer basis, based on the respective contracted bandwidths, to thereby perform bandwidth control;

a first acknowledgement-back section configured to send back an acknowledgement to the first communication device via the access-network interface, on behalf of the at least one second communication device, in response to the data packets outputted from each of the first buffers, on a per-buffer-basis;

an encapsulating section configured to encapsulate the data packets using the first data-transfer-protocol outputted from each of the first buffers, by attaching a header of the second data-transfer-protocol to the data packets, to thereby generate data packets using the second data-transfer-protocol from the data packets using the first data-transfer-protocol; and a first transfer section configured to transfer the encapsulated data packets to the partner data transfer device via the wide area network.

According to a second aspect of the invention, a method of operating a data transfer device is provided, which comprises:

preparing the data transfer device to include:

an access-network interface that allows the data transfer device to be connected to at least one first communication device via a first access network; and a wide-area-network interface that allows the data transfer device to be connected to a wide area network having a contracted bandwidth managed by a telecommunication carrier, wherein the data transfer device is connected to a partner data transfer device via the wide area network, the partner data transfer device is configured to be substantially common in function to the data transfer device, the partner data transfer device is connected to at least one second communication device, whereby the data transfer device and the partner data transfer cooperate to relay data packets between the at least one first and at least one second communication devices via the wide area network, the method further comprising:

establishing a connection using a second data-transfer-protocol between the data transfer device and the partner data transfer device via the wide-area-network interface;

recognizing establishment of a connection using a first data-transfer-protocol between the first and second communication devices via the access-network interface and the wide-area-network interface;

temporarily storing in a plurality of first buffers, data packets using the first data-transfer-protocol received via the access-network interface, with the first buffers associated with respective contracted bandwidths;

controlling output of the data packets from the first buffers, on a per-buffer basis, based on the respective contracted bandwidths, to thereby perform bandwidth control;

in response to the data packets outputted from each of the first buffers, on a per-buffer basis, sending back an acknowledgement to the first communication device via the access-network interface, on behalf of the at least one second communication device;

encapsulating the data packets using the first data-transfer-protocol outputted from each of the first buffers, by attaching a header of the second data-transfer-protocol to the data packets, to thereby generate data packets using the second data-transfer-protocol from the data packets using the first data-transfer-protocol; and transferring the encapsulated data packets to the partner data transfer device via the wide area network.

According to a third aspect of the invention, a method of operating a data transfer device, comprising:

preparing the data transfer device by connecting the data transfer device to at least one first communication device via a first access network, and by connecting the data transfer device to a partner data transfer device via a wide area network, wherein the partner data transfer device is configured to be substantially common in function to the data transfer device, and the partner data transfer device is connected to at least one second communication device, whereby the data transfer device and the partner data transfer cooperate to relay data packets between the at least one first and at least one second communication devices via the wide area network, the method further comprising:

receiving a plurality of first-protocol-based data packets from the at least one first communication device via a first-protocol-based connection within the first access network;

in response to the reception of the first-protocol-based data packets, sending back an acknowledgement to the at least one first communication device via the first-protocol-based connection, on behalf of the at least one communication device;

encapsulating the first-protocol-based data packets received from the at least one first communication device, to thereby convert the first-protocol-based data packets to a plurality of second-protocol-based data packets; and transferring the second-protocol-based data packets to the partner data transfer device via a second-protocol-based connection within the wide area network, the first protocol is a sliding window protocol that allows a window size to be determined using the acknowledgements, and the second protocol is a protocol that allows a window size to be determined without using any acknowledgements.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
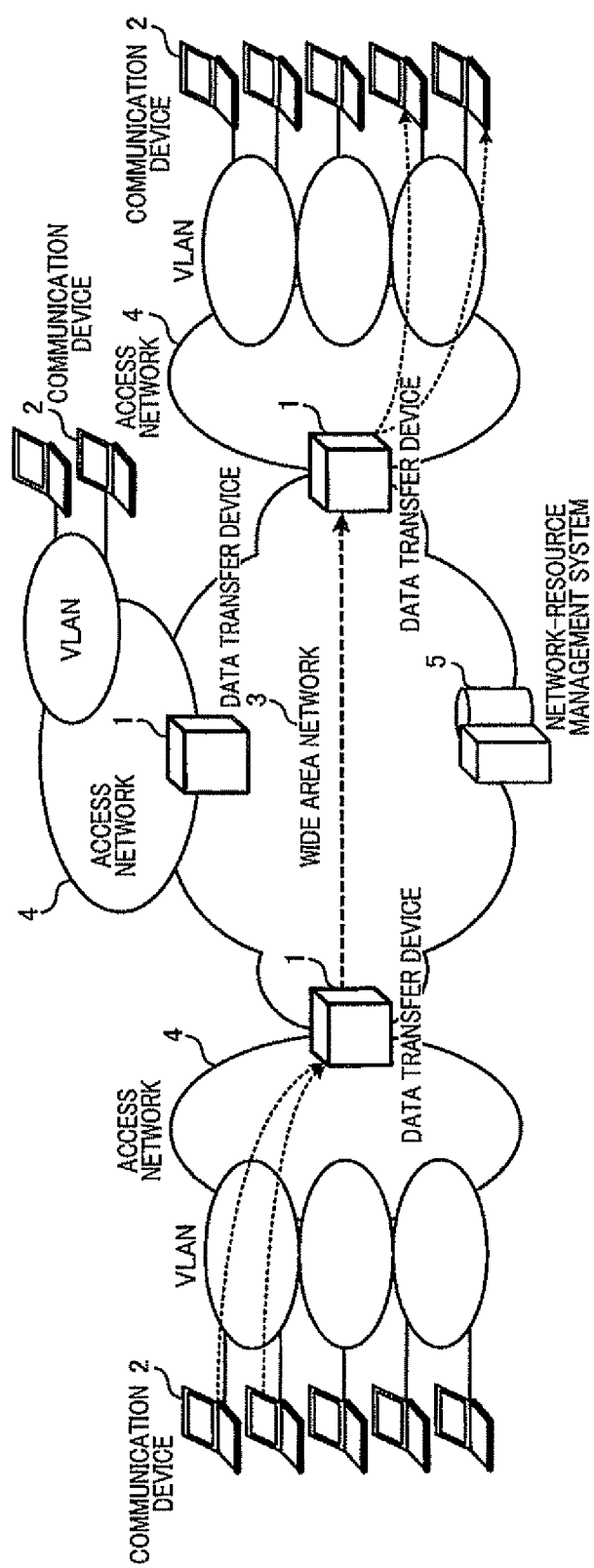
FIG. 1 is a schematic diagram illustrating an exemplary communication system in which data transfer is performed according to an illustrative embodiment of the present invention.

According to the invention, the following modes are provided as illustrative embodiments of the invention.

According to a first mode of the invention, there is provided the data transfer device according to the first aspect of the invention, wherein the first data-transfer-protocol is a TCP (Transmission Control Protocol), and the second data-transfer-protocol is a UDT (UDP (User Datagram Protocol)-based data transfer).

According to a second mode of the invention, there is provided the data transfer device according to the first aspect or the first mode, further comprising:

a second acknowledgement-back section configured to send back an acknowledgement to the partner data transfer device, according to the second data-transfer-protocol, upon reception of data packets using the second data-transfer-protocol via the wide-area-network interface from the partner data transfer device;

a de-capsulating section configured to de-capsulate the data packets using the second data-transfer-protocol, which is received from the partner data transfer device, to thereby generate data packets using the first data-transfer-protocol from the data packets using the second data-transfer-protocol;

a plurality of second buffers for temporary storage of the de-capsulated data packets, with the second buffers associated with respective contracted bandwidths; and a second transfer section configured to transfer the data packets using the first data-transfer-protocol, from each of the second buffers, via the access-network interface.

According to a third mode of the invention, there is provided the data transfer device according to the second mode, wherein each acknowledgement to be transmitted by the second acknowledgement-back section has a source address and a destination address which are pre-selected to be distinct from a source address and a destination address of the data packets, the second acknowledgement-back section is further configured to send each acknowledgement in a second bandwidth distinct from the contracted bandwidth, and the second bandwidth is equal in width to a predetermined percentage of the contracted bandwidth.

According to a fourth mode of the invention, there is provided the data transfer device according to the second or third mode, wherein the bandwidth controller is further configured to control a quantity of data packets to be outputted from each of the first buffers, using tokens, based on the contracted bandwidth, the data transfer device further comprises:

a congestion notification section configured to transmit a congestion notification to the partner data transfer device, when each of the second buffers stores data packets using the first data-transfer protocol, with a total number of data packets not less than a predetermined threshold; and a token controller configured to transmit an instruction to the bandwidth controller for lengthening a time interval between successive tokens, upon reception of the congestion notification from the partner data transfer device, to thereby lengthen a time interval between successive acknowledgements to be sent to the first communication device, in order to lower a transmission rate of the first access network.

According to a fifth mode of the invention, there is provided the data transfer device according to the fourth mode, wherein the token controller is further configured to recover the original transmission rate, by an AIMD (Additive Increase Multiplicative Decrease) algorithm.

According to a sixth mode of the invention, there is provided the data transfer device according to the fourth or fifth mode, wherein the congestion notification transmitted by the congestion notification section contains a control information segment of a header of each data packet using the second data-transfer-protocol, which has an identifier that indicates at least one of the second buffers which experiences congestion, and the token controller is further configured to operate upon reception of the congestion notification, in order to retrieve the identifier contained in the control information segment of the header of each data packet using the second data-transfer-protocol, and to transmit an instruction to the bandwidth controller, for lengthening the time interval between successive tokens for at least one of the first buffers which is associated with the retrieved identifier.

According to a seventh mode of the invention, there is provided the data transfer device according to any one of the first aspect and the first through sixth modes, wherein the at least one first communication device includes a plurality of first communication device which are connected to a plurality of first VLANs (Vritual LANs) via the first access network, and the first buffers are associated with the plurality of first VLANs, respectively.

According to an eighth mode of the invention, there is provided the data transfer device according to any one of the first aspect and the first through seventh modes, wherein the at least one second communication device includes a plurality of second communication device which are connected to a plurality of second VLANs (Vritual LANs) via the second access network, and the second buffers are associated with the plurality of second VLANs, respectively.

According to a ninth mode of the invention, there is provided the method according to the second aspect of the invention, further comprising:

upon reception of the data packets using the second data-transfer-protocol via the wide-area-network interface, from the partner data transfer device, sending back an acknowledgement to the partner data transfer device, according to the second data-transfer-protocol;

upon reception of the data packets using the second data-transfer-protocol, from the partner data transfer device, de-capsulating the data packets, to thereby generate data packets using the first data-transfer-protocol from the data packets using the second data-transfer-protocol;

temporarily storing in a plurality of second buffers the de-capsulated data packets, with the second buffers associated with respective contracted bandwidths; and transferring the data packets using the first data-transfer-protocol, from each of the second buffers, via the access-network interface.

According to a tenth mode of the invention, there is provided the data transfer device according to any one of the first aspect and the first through eighth modes, wherein the first data-transfer-protocol is a sliding window protocol that allows a window size to be determined using the acknowledgements, and the second data-transfer-protocol is a protocol that allows a window size to be determined without using any acknowledgements.

According to an eleventh mode of the invention, there is provided the method according to the second aspect or the ninth mode, wherein the first data-transfer-protocol is a sliding window protocol that allows a window size to be determined using the acknowledgements, and the second data-transfer-protocol is a protocol that allows a window size to be determined without using any acknowledgements.

According to a twelfth mode of the invention, there is provided the method according to the third aspect of the invention, further comprising:

receiving the plurality of second-protocol-based data packets from the partner data transfer device via the second-protocol-based connection;

in response to reception of the second-protocol-based data packets, sending back an acknowledgement to the partner data transfer device via the second-protocol-based connection;

de-capsulating the second-protocol-based data packets received from the partner data transfer device, to thereby restore the plurality of first-protocol-based data packets from the second-protocol-based data packets; and transferring the first-protocol-based data packets to the at least one second communication device via the first-protocol-based connection.

According to a thirteenth mode of the invention, there is provided the method according to the third aspect or the twelfth mode, wherein the first protocol includes a TCP (Transmission Control Protocol), and the second protocol includes a UDT (UDP (User Datagram Protocol)-based Data Transfer) protocol.

According to a fourteenth mode of the invention, there is provided a computer-readable non-transitory storage medium having stored therein a program which, when executed by a computer, effects the method according to any one of the second and third aspects and the eighth, ninth and eleventh through thirteenth modes.

The "computer-readable non-transitory storage medium" may be realized in any one of a variety of types, including a magnetic recording medium, such as a flexible-disc, an optical recording medium, such as a CD and a CD-ROM, an optical-magnetic recording medium, such as an MO, an unremovable storage, such as a ROM, for example.

Several presently preferred embodiments of the invention will be described in more detail by reference to the drawings in which like numerals are used to indicate like elements throughout.

Referring now to FIG. 1, an exemplary communication system is illustrated in a schematic diagram, in which data transfer is performed according to an illustrative embodiment of the present invention.

As illustrated in FIG. 1, the communication system is configured such that a plurality of data transfer devices 1 (e.g., edge routers) are connected to and between a wide area network (WAN) 3 and a plurality of access networks 4. The wide area network 3 has a bandwidth managed by a telecommunication carrier. The carrier can provide services to contracted users or enterprises such that their contracted bandwidths are maintained.

The plurality of data transfer devices 1 are substantially common in function to each other. At each instantaneous time, communication is made between two of the data transfer devices 1. For the ease of description, one of the two data transfer devices 1 which are communicating with each other will be referred to simply as "data transfer device 1," while the other of the two data transfer devices 1 will be referred to as "partner data transfer device 1."

Each data transfer device 1 acts as a sender-side data transfer device 1 for packet transmission to its partner or counterpart data transfer device 1 in some cases, and acts as a receiver-side data transfer device 1 for packet reception from its partner or counterpart data transfer device 1 in other cases.

A plurality of communication devices (e.g., data terminals, servers, etc.) 2 located in a customer enterprise, are connected to, for example, a plurality of LANs (Local Area Networks) located in the enterprise, and are, in turn, connected to the plurality of access networks 4. As a result, each communication device 2 is connected to the wide area network 3 via one of the data transfer devices 1. Then, each communication device 2 that joins one of the access networks 4 can communicate with other communication devices 1 that join another access network 4, via the wide area network 3.

In an exemplary implementation, in each local branch of a particular enterprise, a sub-plurality of the plurality of communication devices 2 are located and are connected to one of the access networks 4 via a plurality of VLANs (Virtual LANs).

As illustrated in FIG. 1, a network-resource management system 5 is connected to the wide area network 3. The network-resource management system 5 is configured to control bandwidths of each data transfer device 1 and the wide area network 3 for the contracted users, such that the available bandwidths are maintained according to the contracts made between the carrier and the contracted users.

Figure 2:
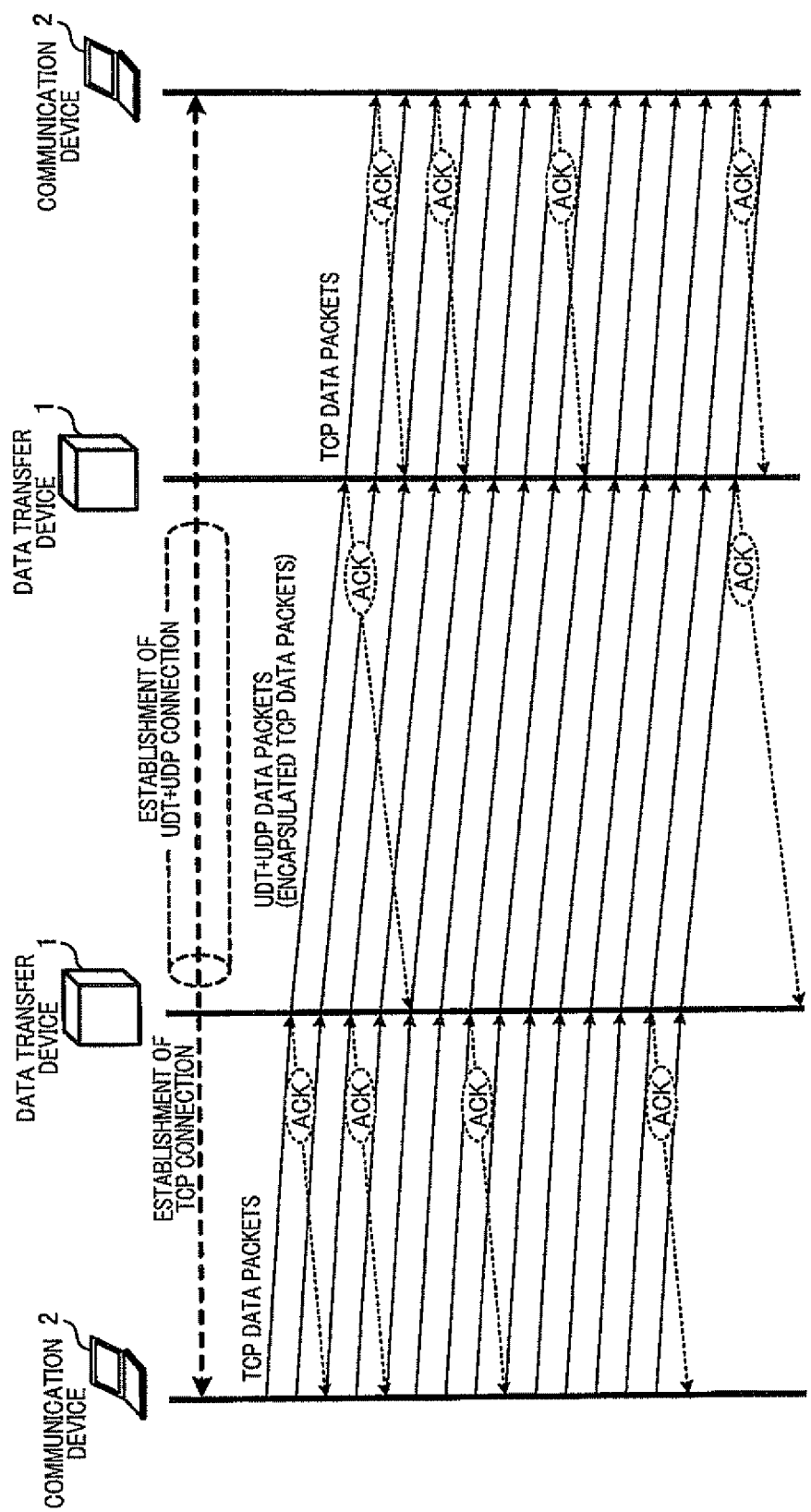
FIG. 2 is a sequence chart illustrating the data transfer.

Referring next to FIG. 2, the sequence of the data transfer according to the present embodiment is illustrated in a sequence chart, which is performed between two representative ones of the communication devices 2 which join different two of the access networks 4 and two representative ones of the data transfer devices 1 which join those different access networks 4 (i.e., the data transfer device 1 and the partner data transfer device 1).

As illustrated in FIG. 2, the data transfer device 1 establishes UDT (UDP (User Datagram Protocol)-based Data Transfer) (i.e., an exemplary second data-transfer-protocol), with the partner data transfer device 1 via the intervened wide area network 3.

UDT is a reliable UDP based application level data transport protocol, and is also a highly configurable framework that can accommodate various congestion control algorithms. UDT allows a window size to be determined without using any acknowledgements, while TCP allows a window size to be determined acknowledgements. UDT provides an acknowledgement mechanism, while UDP does not provide any acknowledgement mechanisms.

In addition, UDP is an example of a connectionless protocol which does not implements a sliding window acknowledgement system, while TCP is an example of a connection-oriented protocol.

UDT uses UDP in transmitted frames of data packets. The data transfer device 1 has the function of encapsulating original TCP data packets with UDT+UDP headers to generate UDT data packets, and of de-capsulating UDT data packets to restore the original TCP data packets.

Between a sender-side communication device 2 and a receiver-side communication device 2, a TCP (Transmission Control Protocol) (i.e., an exemplary first data-transfer-protocol) is established via both the TCP connection of the access networks 4 and the UDT connection of the wide area network 3.

The data transfer device 1 recognizes the establishment of the TCP connection between the sender-side communication device 2 and the receiver-side communication device 2, and in response to that, the data transfer device 1 performs unique data transfer (including transmission and reception of data packet and acknowledgements) as described below.

"UDT" is a UDP-based protocol according to which the receiver-side data transfer device 1 measures a bandwidth available at the receiver-side data transfer device 1, at regular intervals, and the receiver-side data transfer device 1 notifies the sender-side data transfer device 1 of a window size based on the bandwidth measurement. Upon reception, the sender-side data transfer device 1 transmits a number of data packets within the window size notified. Actually, data packets are transferred according to the UDP requiring less computational burden. This scheme allows data packets to be transferred with a throughput which is always near the maximum limit all the time. UDT is a protocol that allows the window size to be determined without using any acknowledgements. As a result, UDT provides faster data transfer than TCP.

Because of this, the data transfer device 1 transfers TCP data packets via the wide area network 3, with the TCP data packets encapsulated with UDT+UDP headers. Sending-back of acknowledgements for TCP data packets is performed between one of the communication devices 2 and a corresponding one of the data transfer devices 1. On the other hand, sending-back of acknowledgements for UDT data packets is performed between the data transfer device 1 and the partner data transfer device 1.

One of these two data transfer device 1, 1 which transmits data to the other will be also referred to as "sender-side data transfer device," and which receives data from the other will be also referred to as "receiver-side data transfer device."

It is noted that, in general, one acknowledgement is sent back from a receiver to a sender, according to the UDT protocol, per a series of 833 data packets received.

Figure 3:
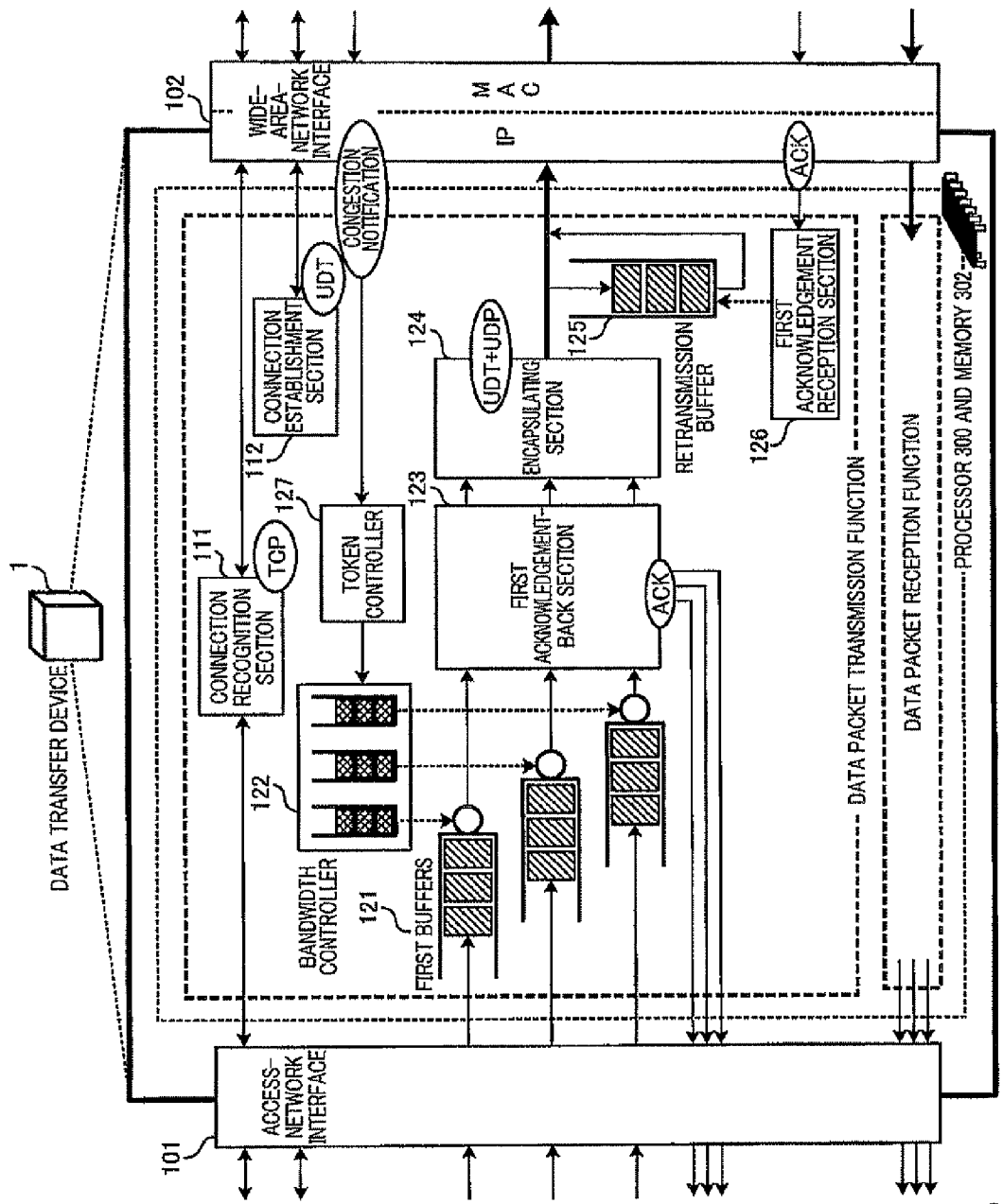
FIG. 3 is a functional block diagram illustrating a data transfer device depicted in FIG. 1, particularly with respect to a data transmission function.

FIG. 3 illustrates the configuration of a representative one of the data transfer devices 1 especially with respect to its data transmission function. The data transfer device 1 receives data packets from the sender-side communication device 2, and transmits the received data packets to the partner data transfer device 1. In this situation, the data transfer device 1 depicted in FIG. 3 can be considered as a sender-side data transfer device 1.

As illustrated in FIG. 3, the data transfer device 1 is configured to include an access-network interface 101 which connects the data transfer device 1 to the sender-side communication devices 2 via the associated access network 4, and a wide-area-network interface 102 which connects the data transfer device 1 to the wide area network 3 having a bandwidth managed by the carrier.

As illustrated in FIG. 3, the data transfer device 1 is further configured to also include a connection recognition section 111; a connection establishment section 112; a data-packet transmission function; and a data-packet reception function. These components are implemented by operating a processor 300 built in the data transfer device 1 to execute a predetermined computer program (not shown) using a memory 302.

The connection establishment section 112 is configured to establish a UDT connection with the partner data transfer device 1.

The connection recognition section 111 is configured to recognize the fact that the TCP connection has been established between the sender-side communication device 2 and the receiver-side communication device 2, via the UDT connection over the wide area network 3.

The data-packet transmission function includes a plurality of first buffers (bandwidth-specific transmission buffers) 121; a bandwidth controller 122; a first acknowledgement-back section 123; an encapsulating section 124; a retransmission buffer 125; a first acknowledgement reception section 126; and a token controller 127.

The plurality of first buffers 121 store or buffer TCP data packets which have been received through the access-network interface 101, with the first buffers 121 associated with respective contracted bandwidths. In an exemplary implementation, the contracted bandwidths are associated with the plurality of VLANs, respectively.

The bandwidth controller 122 is configured to control how data packets are outputted from (or read out of) the first buffers 121, on a per-buffer basis, based on the respective contracted bandwidths. The contracted bandwidths have been allocated transmission rates, respectively. More specifically, the bandwidth controller 122 controls the maximum amount of data which are to be transmitted in the form of data packets, using tokens. It is, in general, referred to as "token-bucket-based rate control."

The token-bucket-based rate control is performed for transmitting data packets at a rate determined by a token bucket algorithm. A "token" represents authorization of readout of a unit of data from a packet buffer. The token bucket algorithm is an algorithm used for transmitting data packets at a rate determined based on the number of tokens stored in a token bucket. This algorithm has three parameters: a token rate (i.e., the number of tokens to be newly generated per unit time), a token bucket size (i.e., the maximum number of tokens that can be stored in a token bucket), and a buffer size (i.e., the maximum number of data packets that can be stored in a packet buffer).

New tokens are generated and added to the token bucket at a predetermined rate all the time. A token, if overflows from the token bucket having its token bucket size, will be discarded. Likewise, a data packet, if overflows from the packet buffer, will be discarded. Some data packets, after having added to the packet buffer, are read out from the packet buffer, as some tokens are outputted from the token bucket, with the same number of the data packets read out from the packet buffer as that of the outputted tokens from the token bucket. When the token bucket has no tokens stored, there is no data packet transmission. If the same number of tokens as required for data packet transmission is added to the token bucket, then data packets are transmitted from the packet buffer. The average of readout rates of data packets from the packet buffer is so limited not to exceed the token rate, and the possible maximum length of burst is so limited not to exceed the token bucket size.

The bandwidth controller 122 is configured to a selected one of the following two operations, depending on the context of a contract made between the carrier and the customer:

(1) Operation No. 1: As long as a physical-layer transmission rate for the wide-area-network interface 102 has an unused portion, the output rate of data packets from the first buffers 121 is not reduced, even if it goes beyond the contracted bandwidth. In an example where the physical-layer transmission rate is 1 Gbps, while the total value of the contracted bandwidths is 300 Mbps, an unused portion of the physical-layer transmission rate is equal to 700 Mbps; and (2) Operation No. 2: Even if the physical-layer transmission rate for the wide-area-network interface 102 has an unused portion, the output rate of data packets from the buffers 121 is limited to the contracted bandwidth.

The first acknowledgement-back section 123 is configured to send back an ACK (acknowledgement) to the sender-side communication device 2 via the access-network interface 101 on behalf of the receiver-side communication device 2, in response to readout of TCP data packets from the first buffers 121. Exchange of ACKs (i.e., ACK packets) for TCP data packets is performed between the sender-side communication device 2 and the data transfer device 1. The first acknowledgement-back section 123 delivers TCP data packets received, to the encapsulating section 124.

The encapsulating section 124 is configured to encapsulate TCP data packets with UDT+UDP headers. The encapsulated data packets are transmitted to the partner data transfer device 1 via the wide-area-network interface 102.

Figure 4:
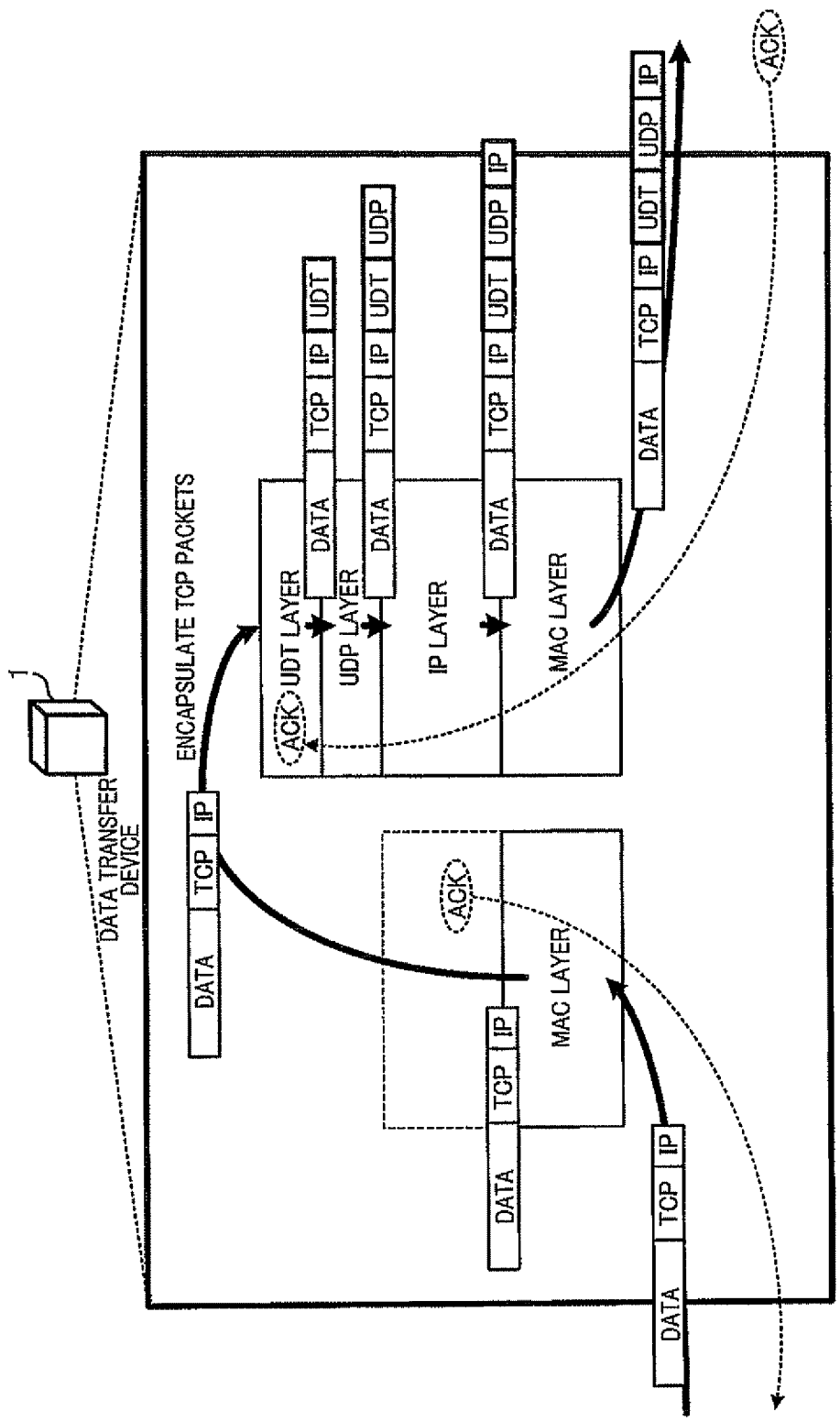
FIG. 4 is a view illustrating the layer configuration of protocol stacks for use in the data transfer device depicted in FIG. 3.

FIG. 4 is a view illustrating the layer configuration of a plurality of protocol stacks for use in the data transfer device 1.

More specifically, in operation, the encapsulating section 124 uses a TCP protocol-stack (illustrated in FIG. 4 on the left-hand side) and a UDT protocol-stack (illustrated in FIG. 4 on the right-hand side). These protocol stacks share at least one layer (only a MAC layer for an example depicted in FIG. 4) with each other.

As illustrated in FIG. 4, the data transfer device 1 receives an IP+TCP data packet from the sender-side communication device 2, via a MAC layer, and forwards the IP+TCP data packet to a UDT layer, which is one of a plurality of layers of the UDT protocol-stack.

The UDT layer operates to add a UDT header to the IP+TCP data packet, to thereby generate a UDT+IP+TCP data packet, and forward the generated UDT+IP+TCP data packet to a UDP layer.

The UDP layer operates to add a UDP header to the UDT+IP+TCP data packet, to thereby generate a UDP+UDT+IP+TCP data packet, and forward the generated UDP+UDT+IP+TCP data packet to an IP layer.

The IP layer operates to add to the UDP+UDT+IP+TCP data packet, an IP header which indicates that the data transfer device 1 is a source, while the partner data transfer device 1 is a destination, to thereby generate and transmit an IP+UDP+UDT+IP+TCP data packet, via a MAC layer.

As illustrated in FIG. 3, the retransmission buffer 125 is configured to temporarily store or buffer data packets which have been received from the sender-side communication device 2 and which are to be sent to the partner data transfer device 1.

Some of the stored data packets, which have not been acknowledged as received by the partner data transfer device 1 (for which the first acknowledgment reception section 126 has not received a corresponding ACK from the partner data transfer device 1), are retransmitted to the partner data transfer device 1. On the other hand, some of the stored data packets, which have been acknowledged as received by the partner data transfer device 1 (for which the first acknowledgment reception section 126 has received a corresponding ACK from the partner data transfer device 1), are dropped or discarded.

The first acknowledgment reception section 126 is configured to receive an ACK from a second acknowledge-back section 131 (described below with reference to FIG. 5) of the partner data transfer device 1. The first acknowledgment reception section 126 is also configured to control the retransmission buffer 125 in the above manner, based on whether or not the first acknowledgment reception section 126 has received an ACK from the partner data transfer device 1.

The token controller 127 is configured to transmit an instruction to the bandwidth controller 122 for lengthening a time interval between successive tokens, upon reception of a congestion notification from a congestion notification section 135 (described below with reference to FIG. 5) of the partner data transfer device 1. The instruction can work to lengthen a time interval between successive ACKs to be sent to the sender-side communication device 2, in order to lower a transmission rate of the associated access network 4.

The token controller 127 is further configured to recover the contracted transmission rate, by an AIMD (Additive Increase Multiplicative Decrease) algorithm. In the AIMD algorithm, each time the sender-side data transfer device 1 receives an ACK from the receiver-side data transfer device 1, and acknowledges that a previous data packet has correctly been reached, the transmission rate increases in a linear or additive fashion. Conversely, if the sender-side data transfer device 1 does not receive any ACK and cannot acknowledge that a previous data packet has been correctly reached, then the transmission rate decreases in an exponential or multiplicative fashion. The AIMD allows the transmission rate to vary frequently in a saw-tooth behavior.

The congestion notification transmitted from the congestion notification section 135 of the partner data transfer device 1 contains a control information segment of a header of each UDT data packet, which has a congested-buffer identifier of at least one of a plurality of second buffers 133 (described below with reference to FIG. 5) which is congested or full, in the form of, for example, respective VLAN tags.

The token controller 127 is further configured to operate upon reception of the congestion notification, in order to retrieve the congested-buffer identifier from the control information segment of the header of each UDT data packet. The token controller 127 is still further configured to transmit an instruction to the bandwidth controller 122, for lengthening the time interval between successive tokens for at least one of the first buffers 121 which is associated with the retrieved congested-buffer identifier.

Figure 5:
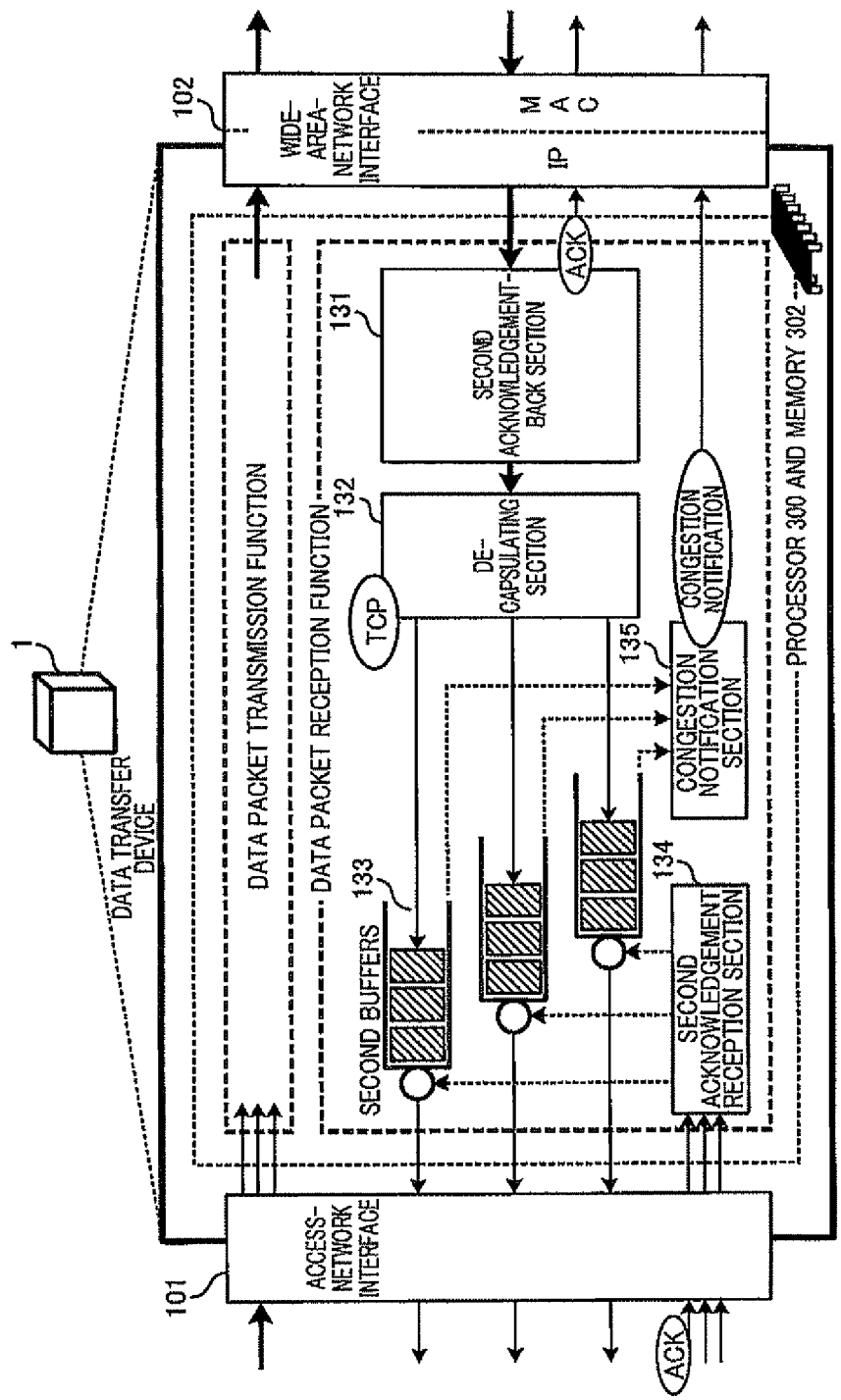
FIG. 5 is a functional block diagram illustrating the data transfer device depicted in FIG. 1, particularly with respect to a data reception function.

FIG. 5 is a functional block diagram illustrating the data transfer device 1 (which acts as the partner data transfer device relative to the data transfer device 1 depicted in FIG. 3), particularly with respect to a data reception function. The data transfer device 1 depicted in FIG. 5 receives data packets from the partner data transfer device 1 (which acts as the data transfer device 1 depicted in FIG. 3), and transmits the received data packets to the receiver-side communication device 2. The data transfer device 1 depicted in FIG. 5 is considered as a receiver-side data transfer device 1.

The data transfer device 1 has a data packet reception function which includes the above-mentioned second acknowledgement-back section 131; a de-capsulating section 132; the above-mentioned plurality of second buffers 133 (bandwidth-specific reception buffers); a second acknowledgement reception section 134; and the above-mentioned congestion notification section 135. These components are implemented by operating the processor 300 built in the data transfer device 1 to execute a predetermined computer program (not shown) using the memory 302.

The second acknowledgement-back section 131 is configured to receive UDT data packets from the partner data transfer device 1 via the wide-area-network interface 102. The second acknowledgement-back section 131 is further configured to send back an ACK to the partner data transfer device 1 via the wide-area-network interface 102, according to the UDT protocol, in response to the correct reception of UDT data packets from the partner data transfer device 1.

The second acknowledgement-back section 131 is further configured to transmit an ACK within a second bandwidth distinct from the contracted bandwidth allocated between the communication device 2 and the partner data transfer device 1 for the wide area network 3. An ACK has a congested-buffer identifier of at least one of the first buffers 121 which is congested or full, in the form of, for example, respective VLAN tags.

In an exemplary implementation, each ACK to be transmitted by the second acknowledgement-back section 131 has a source address and a destination address which are pre-selected to be distinct from a source address and a destination address of each UDT data packets. This allows ACK packets and UDT data packets to be transmitted and received in distinct bandwidths.

Further, in this implementation, the second acknowledgement-back section 131 is configured to send back each ACK in a second bandwidth distinct from the contracted bandwidth of the wide area network 3. The second bandwidth is equal in width to a predetermined percentage of the contracted bandwidth. This means that ACK packets are surely allocated a pre-selected communication bandwidth. In an example, the second bandwidth exclusively for ACK packets may be equal to 0.1% of the contracted bandwidth. ACK packets are identified with IP addresses or VLAN tags.

As illustrated in FIG. 5, the de-capsulating section 132 is configured to de-capsulate UDT data packets received from the second acknowledgement-back section 131, by removing a UDT header from the received UDT data packets, to thereby restore the original data packets, that is, TCP data packets. The TCP data packets are delivered to the plurality of second buffers 133.

The plurality of second buffers 133 are configured to temporarily buffer or store the TCP data packets created by the de-capsulation, with the second buffers 133 associated with respective contracted bandwidths. Each second buffer 133 is further configured to output some of the stored TCP data packets to the access-network interface 101, in response to the reception of an ACK at the second acknowledgement reception section 134. The access-network interface 101 allows the TCP data packets to be sent to the receiver-side communication device 2 via the associated access network 4.

The second acknowledgement reception section 134 is configured to receive an ACK from the receiver-side communication device 2. The received ACKs are used for controlling output of data packets from the second buffers 133.

The congestion notification section 135 is configured to transmit a congestion notification (CN) to the partner data transfer device 1, at the time that the total number of TCP data packets stored in each of the second buffers 133 reaches or exceeds a predetermined threshold; and The congestion notification transmitted by the congestion notification section 135 contains a control information segment of a header of each UDT data packet, which has a congested-buffer identifier that identifies at least one of the second buffers 133 which is congested or full, in the form of, for example, respective VLAN tags.

Figure 6:
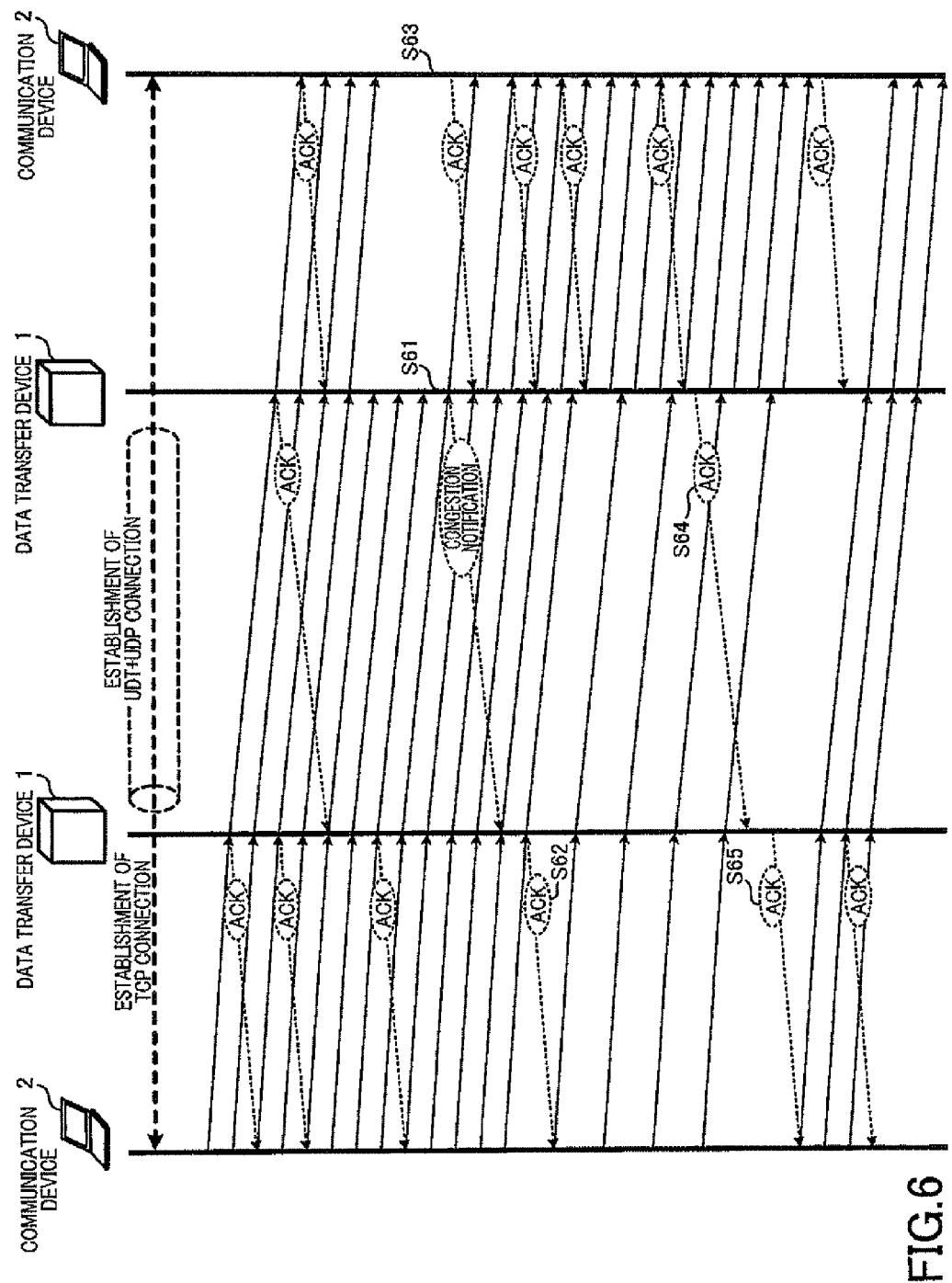
FIG. 6 is a sequence chart illustrating congestion notification in the data transfer.

FIG. 6 is a sequence chart illustrating the sequence of the process for the congestion notification in the data transfer according to the present embodiment.

(S61) At a given point of time, one of the data transfer devices 1 performs packet reception from the partner data transfer device 1 (hereinafter, referred to as "receiver-side data transfer device 1," as illustrated in FIG. 5, and in FIG. 6 on the right-hand side) and another data transfer device 1 performs packet transmission to the partner data transfer device 1 (hereinafter, referred to as "sender-side data transfer device 1," as illustrated in FIG. 3, and in FIG. 6 on the left-hand side).

The receiver-side data transfer device 1 is receiving UDT data packets from the sender-side data transfer device 1, but it is assumed that the receiver-side data transfer device 1 cannot transmit TCP data packets to the receiver-side communication device 2 illustrated in FIG. 6 on the right-hand side.

In this exemplary scenario, the reception buffers (i.e., the second buffers 133) of the receiver-side data transfer device 1 are congested or full. At this moment, the receiver-side data transfer device 1 transmits a congestion notification to the sender-side data transfer device 1. The sender-side data transfer device 1, upon reception of the congestion notification, transmits an ACK indicating a reduced window size, to the sender-side data transfer device 1.

As a result, the sender-side data transfer device 1 directs the bandwidth controller 122 to reduce the occurrence frequency of tokens, to thereby reduce the throughput of UDT data packets being transmitted to the receiver-side data transfer device 1.

(S62) Due to the reduction in the throughput of UDT data packets, the transmission buffers (i.e., the first buffers 121) of the sender-side data transfer device 1 become congested or full. At this moment, the sender-side data transfer device 1 sends back an ACK indicating a reduced window size for TCP data packets, to the sender-side communication device 2 illustrated in FIG. 6 on the left-hand side. In response, the sender-side communication device 2 reduces the transmission rate of TCP data packets.

(S63) Thereafter, the receiver-side communication device 2 sends back an ACK indicating an increased window size to the receiver-side data transfer device 1. In reply, the receiver-side data transfer device 1 transmits TCP data packets from the reception buffers 133 to the receiver-side communication device 2.

(S64) Assuming that the reception buffers 133 of the receiver-side data transfer device 1 have been brought into a non-congested state, the receiver-side data transfer device 1 sends back an ACK indicating an increased window size for UDT data packets, to the sender-side data transfer device 1. In response, the sender-side data transfer device 1 directs the bandwidth controller 122 to restore the original occurrence frequency of tokens, to thereby restore the contracted throughput of UDT data packets.

(S65) Assuming that the transmission buffers 121 of the sender-side data transfer device 1 have been brought into a non-congested state, the sender-side data transfer device 1 sends back an ACK indicating an increased window size to the sender-side communication device 2. In response, the sender-side communication device 2 restores the original throughput of TCP data packets.

Figure 7:
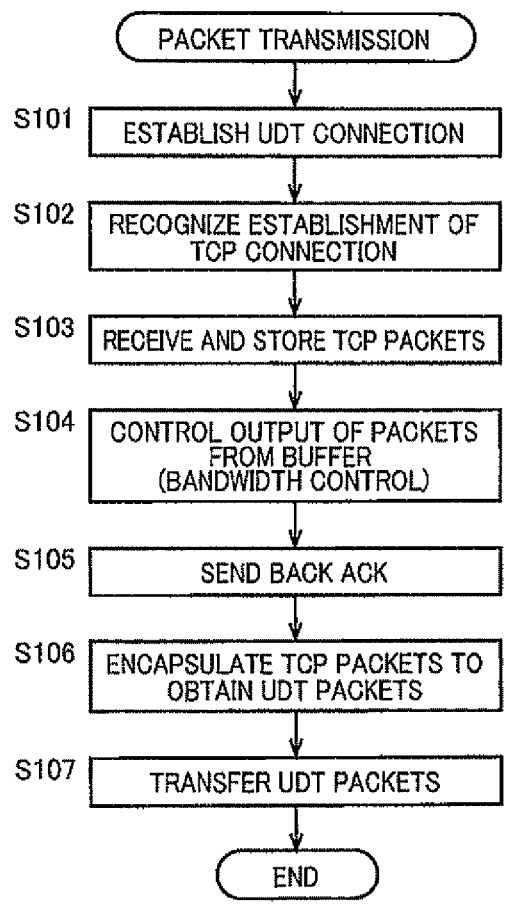
FIG. 7 is a process chart illustrating a portion of the data transfer which relates to the data transmission function.

FIG. 7 is a process chart illustrating a portion of the data transfer which relates to the data transmission function; and (S101) Establishment of UDT Connection The sender-side data transfer device 1 establishes a UDT connection between the sender-side data transfer device 1 and the receiver-side data transfer device 1 via the wide-area-network interface 102.

(S102) Recognition of Establishment of TCP Connection

The sender-side data transfer device 1 recognizes establishment of a TCP connection between the sender-side and receiver-side communication devices 2, 2 via the access-network interface 101 and the wide-area-network interface 102.

(S103) Buffering of TCP Data Packets

The sender-side data transfer device 1 temporarily stores in the first buffers 121, TCP data packets received via the access-network interface 101, with the first buffers 121 associated with respective contracted bandwidths.

(S104) Bandwidth Control

The sender-side data transfer device 1 controls output of the TCP data packets from the first buffers 121, on a per-buffer basis, based on the respective contracted bandwidths, to thereby perform bandwidth control.

(S105) Sending-Back of ACK

In response to the TCP data packets outputted from each of the first buffers 121, the sender-side data transfer device 1 sends back an ACK to the sender-side communication device 2 via the access-network interface 101, on a per-buffer basis, as if the sender-side data transfer device 1 were the receiver-side communication device 2, and on behalf of the receiver-side communication device 2.

(S106) Encapsulation of TCP Data Packets

The sender-side data transfer device 1 encapsulates the TCP data packets outputted from each of the first buffers 121, by attaching a header of the UDT protocol to the TCP data packets, to thereby convert the TCP data packets to UDT data packets.

(S107) Transfer of UDT Data Packets

The sender-side data transfer device 1 transfers the encapsulated data packets to the receiver-side data transfer device 1 via the wide area network 3.

Figure 8:
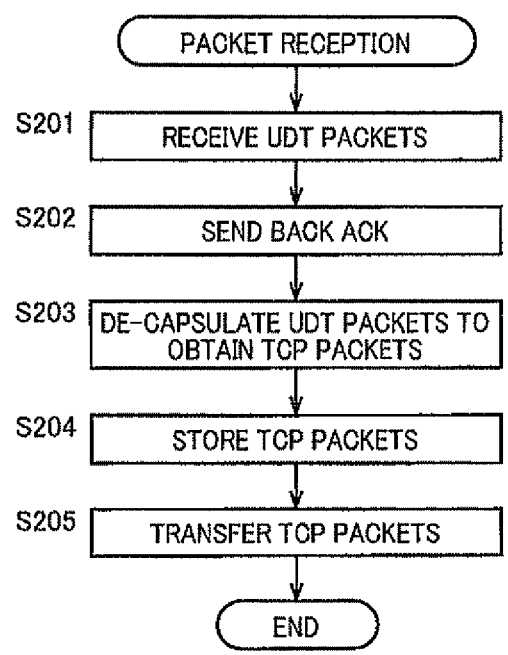
FIG. 8 is a process chart illustrating a portion of the data transfer which relates to the data reception function.

FIG. 8 is a process chart illustrating a portion of the data transfer which relates to the data reception function.

(S201) Sending-Back of ACK

Upon reception of the UDT data packets via the wide-area-network interface 102, from the sender-side data transfer device 1, the receiver-side data transfer device 1 sends back an ACK to the sender-side data transfer device 1, according to the UDT protocol.

(S202) De-Caplusation of UDT Data Packets

Upon reception of the UDT data packets from the sender-side data transfer device 1, the receiver-side data transfer device 1 de-capsulates the UDT data packets, to thereby restore the original data packets, that is, the TCP data packets.

(S203) Buffering of TCP Data Packets

The receiver-side data transfer device 1 temporarily stores the second buffers 133 the de-capsulated data packets, with the second buffers 133 associated with respective contracted bandwidths.

(S204) Transfer of TCP Data Packets

The receiver-side data transfer device 1 transfers the TCP data packets from each of the second buffers 133, via the access-network interface 101.

Through the above-described procedure, the sender-side data transfer device 1 and the receiver-side data transfer device 1 cooperate to relay TCP data packets, between the sender-side communication device 2 and the receiver-side communication device 2, through the UDT connection over the wide area network 3.

As will be evident from the foregoing, in the present embodiment, TCP data packets to be transferred between the sender-side and receiver-side communication devices 2, 2 is relayed by the sender-side and receiver-side data transfer device 1, 1, and each data transfer device 1 executes a proprietary software which has no reliance on the UDT protocol employed for the communication devices 2, to thereby perform TCP data packet transmission control (including sending-back of ACKs) between one of the communication devices 2 and one of the data transfer devices 1 which are interconnected via the associated access network 4. As a result, faster data transfer between the communication devices 2, 2 is provided than when TCP data packets are directly transferred between the communication devices 2, 2 without intervention of such data transfer devices 1, 1.

Further, in the present embodiment, a UDT protocol which is faster than TCP is employed for data transfer over the wide area network 3 which is intervened between the TCP-implemented communication devices 2, 2. As a result, opposed to when, alternatively, a TCP connection is established over the wide area network 3 and data packets are transferred through the TCP connection, a UDT connection established over the wide area network 3 is prevented from being data transfer bottleneck, resulting in higher speed data transfer over the wide area network 3 than when a TCP connection is established over the wide area network 3.

Still further, in the present embodiment, despite that a TCP connection is not established over the wide area network 3, a UDT connection established instead allows more reliable data transfer over the wide area network 3 than when a pure UDP is merely employed for the data transfer.

Additionally, in the present embodiment, the throughputs of first-and-second-protocol-based data packets (e.g., TCP data packets and UDT data packets) are controlled based on a contracted bandwidth by controlling the output of the packets from the buffers.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A data transfer device comprising:
an access-network interface that allows the data transfer device to be connected to at least one first communication device via a first access network; and
a wide-area-network interface that allows the data transfer device to be connected to a wide area network having a contracted bandwidth managed by a telecommunication carrier, wherein
the data transfer device is connected to a partner data transfer device via the wide area network, the partner data transfer device is configured to be substantially common in function to the data transfer device,
the partner data transfer device is connected to at least one second communication device, whereby the data transfer device and the partner data transfer cooperate to relay data packets between the at least one first communication device and the at least one second communication device via the wide area network,
the data transfer device further comprising:
a connection establishment section configured to establish a connection using a second data-transfer-protocol between the data transfer device and the partner data transfer device via the wide-area-network interface;
a connection recognition section configured to recognize establishment of a connection using a first data-transfer-protocol between the at least one first communication device and the at least one second communication device via the access-network interface and the wide-area-network interface;
a plurality of first buffers for temporary storage of data packets using the first data-transfer-protocol received via the access-network interface, with the first buffers associated with respective contracted bandwidths;
a bandwidth controller configured to control output of the data packets from the first buffers, on a per-buffer basis, based on the respective contracted bandwidths, to thereby perform bandwidth control;
a first acknowledgement-back section configured to send back an acknowledgement to the at least one first communication device via the access-network interface, on behalf of the at least one second communication device, in response to the data packets outputted from each of the first buffers, on the per-buffer basis;
an encapsulating section configured to encapsulate the data packets using the first data-transfer-protocol outputted from each of the first buffers, by attaching a header of the second data-transfer-protocol to the data packets, to thereby generate data packets using the second data-transfer-protocol from the data packets using the first data-transfer-protocol;
a first transfer section configured to transfer the encapsulated data packets to the partner data transfer device via the wide area network;
a second acknowledgement-back section configured to send back an acknowledgement to the partner data transfer device, according to the second data-transfer-protocol, upon reception of data packets using the second data-transfer-protocol via the wide-area-network interface from the partner data transfer device;

a de-capsulating section configured to de-capsulate the data packets using the second data-transfer-protocol, which is received from the partner data transfer device, to thereby generate data packets using the first data-transfer-protocol from the data packets using the second data-transfer-protocol;

a plurality of second buffers for temporary storage of the de-capsulated data packets, with the second buffers associated with respective contracted bandwidths; and a second transfer section configured to transfer the data packets using the first data-transfer-protocol, from each of the second buffers, via the access-network interface;

the second acknowledgement-back section is further configured to send each acknowledgement in a second bandwidth distinct from the contracted bandwidth, and the second bandwidth is equal in width to a predetermined percentage of the contracted bandwidth.

2. The data transfer device according to claim 1, wherein the first data-transfer-protocol is a TCP (Transmission Control Protocol), and the second data-transfer-protocol is a UDT (UDP (User Datagram Protocol)-based data transfer).

3. The data transfer device according to claim 1, wherein each acknowledgement to be transmitted by the second acknowledgement-back section has a source address and a destination address which are pre-selected to be distinct from a source address and a destination address of the data packets.

4. The data transfer device according to claim 1, wherein the bandwidth controller is further configured to control a quantity of data packets to be outputted from each of the first buffers, using tokens, based on the contracted bandwidth, and the data transfer device further comprises:

a congestion notification section configured to transmit a congestion notification to the partner data transfer device, when each of the second buffers stores data packets using the first data-transfer protocol, with a total number of data packets not less than a predetermined threshold; and a token controller configured to transmit an instruction to the bandwidth controller for lengthening a time interval between successive tokens, upon reception of the congestion notification from the partner data transfer device, to thereby lengthen a time interval between successive acknowledgements to be sent to the first communication device, in order to lower a transmission rate of the first access network.

5. The data transfer device according to claim 4, wherein the token controller is further configured to recover the original transmission rate, by an AIMD (Additive Increase Multiplicative Decrease) algorithm.

6. The data transfer device according to claim 4, wherein the congestion notification transmitted by the congestion notification section contains a control information segment of a header of each data packet using the second data-transfer-protocol, which has an identifier that indicates at least one of the second buffers which experiences congestion, and the token controller is further configured to operate upon reception of the congestion notification, in order to retrieve the identifier contained in the control information segment of the header of each data packet using the second data-transfer-protocol, and to transmit an instruction to the bandwidth controller, for lengthening the time interval between successive tokens for at least one of the first buffers which is associated with the retrieved identifier.

7. The data transfer device according to claim 1, wherein the at least one first communication device includes a plurality of first communication devices which are connected to a plurality of first VLANs (Virtual LANs) via the first access network, and the first buffers are associated with the plurality of first VLANs, respectively.

8. The data transfer device according to claim 1, wherein the at least one second communication device includes a plurality of second communication devices which are connected to a plurality of second VLANs (Virtual LANs) via the second access network, and the second buffers are associated with the plurality of second VLANs, respectively.

9. A method of operating a data transfer device, comprising:

preparing the data transfer device to include:

an access-network interface that allows the data transfer device to be connected to at least one first communication device via a first access network; and a wide-area-network interface that allows the data transfer device to be connected to a wide area network having a contracted bandwidth managed by a telecommunication carrier, wherein the data transfer device is connected to a partner data transfer device via the wide area network, the partner data transfer device is configured to be substantially common in function to the data transfer device, the partner data transfer device is connected to at least one second communication device, whereby the data transfer device and the partner data transfer cooperate to relay data packets between the at least one first communication device and the at least one second communication device via the wide area network, the method further comprising:

establishing a connection using a second data-transfer-protocol between the data transfer device and the partner data transfer device via the wide-area-network interface;

recognizing establishment of a connection using a first data-transfer-protocol between the at least one first communication device and the at least one second communication device via the access-network interface and the wide-area-network interface;

temporarily storing in a plurality of first buffers, data packets using the first data-transfer-protocol received via the access-network interface, with the first buffers associated with respective contracted bandwidths;

controlling output of the data packets from the first buffers, on a per-buffer basis, based on the respective contracted bandwidths, to thereby perform bandwidth control;

in response to the data packets outputted from each of the first buffers, on the per-buffer basis, sending back an acknowledgement to the first communication device via the access-network interface, on behalf of the at least one second communication device;

encapsulating the data packets using the first data-transfer-protocol outputted from each of the first buffers, by attaching a header of the second data-transfer-protocol to the data packets, to thereby generate data packets using the second data-transfer-protocol from the data packets using the first data-transfer-protocol; and transferring the encapsulated data packets to the partner data transfer device via the wide area network;

the operation of sending back the acknowledgement to the partner data transfer device is performed to send each acknowledgement in a second bandwidth distinct from the contracted bandwidth, and the second bandwidth is equal in width to a predetermined percentage of the contracted bandwidth.

10. The data transfer device according to claim 1, wherein the first data-transfer-protocol is a sliding window protocol that allows a window size to be determined using the acknowledgements, and the second data-transfer-protocol is a protocol that allows the window size to be determined without using any acknowledgements.

11. The data transfer device according to claim 9, wherein the first data-transfer-protocol is a sliding window protocol that allows a window size to be determined using the acknowledgements, and the second data-transfer-protocol is a protocol that allows the window size to be determined without using any acknowledgements.

12. A method of operating a data transfer device, comprising:

preparing the data transfer device by connecting the data transfer device to at least one first communication device via a first access network, and by connecting the data transfer device to a partner data transfer device via a wide area network, wherein the partner data transfer device is configured to be substantially common in function to the data transfer device, and the partner data transfer device is connected to at least one second communication device, whereby the data transfer device and the partner data transfer cooperate to relay data packets between the at least one first communication device and the at least one second communication device via the wide area network, the method further comprising:

receiving a plurality of first-protocol-based data packets from the at least one first communication device via a first-protocol-based connection within the first access network;

in response to the reception of the first-protocol-based data packets, sending back an acknowledgement to the at least one first communication device via the first-protocol-based connection, on behalf of the at least one second communication device;

encapsulating the first-protocol-based data packets received from the at least one first communication device, to thereby convert the first-protocol-based data packets to a plurality of second-protocol-based data packets;

transferring the second-protocol-based data packets to the partner data transfer device via a second-protocol-based connection within the wide area network;

receiving the plurality of second-protocol-based data packets from the partner data transfer device via the second-protocol-based connection; and in response to reception of the second-protocol-based data packets, sending back an acknowledgement to the partner data transfer device via the second-protocol-based connection in a bandwidth preselected to be distinct from a contracted bandwidth preassigned to the wide area network.

13. The method according to claim 12, further comprising:

de-capsulating the second-protocol-based data packets received from the partner data transfer device, to thereby restore the plurality of first-protocol-based data packets from the second-protocol-based data packets; and transferring the first-protocol-based data packets to the at least one second communication device via the first-protocol-based connection.

14. The method according to claim 12, wherein the first protocol includes a TCP (Transmission Control Protocol), and the second protocol includes a UDT (UDP (User Datagram Protocol)-based Data Transfer) protocol.

\* \* \* \* \*